United States Patent [19]

Yang

[11] Patent Number: 5,094,913
[45] Date of Patent: Mar. 10, 1992

[54] ORIENTED, SHAPED ARTICLES OF PULPABLE PARA-ARAMID/META-ARAMID BLENDS

[75] Inventor: Hung H. Yang, Richmond, Va.

[73] Assignee: E. I. Du Pont de Nemours and Company, Wilmington, Del.

[21] Appl. No.: 487,930

[22] Filed: Mar. 8, 1990

Related U.S. Application Data

[63] Continuation-in-part of Ser. No. 337,508, Apr. 13, 1989, abandoned.

[51] Int. Cl.$^5$ .................. B32B 27/08; D02G 3/00
[52] U.S. Cl. .................. 428/364; 428/392; 428/373; 428/401; 428/474.4
[58] Field of Search .......... 428/364, 373, 374, 474.4, 428/401, 372; 525/432

[56] References Cited

U.S. PATENT DOCUMENTS

| | | | |
|---|---|---|---|
| 3,767,756 | 10/1973 | Blades | 264/184 |
| 3,869,429 | 3/1975 | Blades | 260/78 S |
| 4,120,914 | 10/1978 | Behnke et al. | 525/432 |
| 4,198,494 | 4/1980 | Burckel | 525/432 |
| 4,228,218 | 10/1980 | Takayanagi et al. | 528/58 |
| 4,340,559 | 7/1982 | Yang | 264/181 |
| 4,698,267 | 10/1987 | Tokarsky | 162/146 X |
| 4,836,507 | 6/1989 | Yang | 264/143 |
| 4,888,091 | 12/1989 | Nollen et al. | 162/146 |

FOREIGN PATENT DOCUMENTS

| | | |
|---|---|---|
| 57-183420 | 11/1982 | Japan . |
| 116411 | 7/1984 | Japan . |
| 163418 | 9/1984 | Japan . |

Primary Examiner—Lorraine T. Kendell

[57] ABSTRACT

Oriented, shaped articles such as films or fibers of para-aramid/meta-aramid blends which ar useful for the manufacture of para-aramid pulp, a process for making such articles and a pulp-making process are disclosed.

9 Claims, 3 Drawing Sheets

ORIENTED, SHAPED ARTICLES OF PULPABLE PARA-ARAMID/META-ARAMID BLENDS

BACKGROUND OF THE INVENTION

This application is a continuation-in-part of application Ser. No. 07/337,508 filed Apr. 13, 1989 and now abandoned.

The present invention relates to para-aramid pulp and more particularly relates to oriented, shaped articles such as films or fibers of para-aramid/meta-aramid blends which are useful for the manufacture of para-aramid pulp.

The industrial demand for para-aramid pulp such as the poly(p-phenylene terephthalamide) pulp sold under the trademark Kevlar ® by E. I. du Pont de Nemours & Co. has been steadily increasing. Due to high temperature stability, strength and wear resistance, para-aramid pulp is increasingly being used in brake linings and gaskets to replace asbestos with its known health risks. Para-aramid pulp is also being used in newly-developed papers, laminates and composites for applications requiring high strength and temperature stability.

Most para-aramid pulp is produced by first spinning oriented, continuous filaments of the poly(p-phenylene terephthalamide) polymer in accordance with the dry-jet wet spinning process disclosed in U.S. Pat. No. 3,767,756 and then mechanically converting the filaments into pulp by first cutting into short fibers and then abrading the short fibers into pulp. In the abrasion process, the filaments of poly(p-phenylene terephthalamide) fibrillate to form pulp but only with the expenditure of a large amount of mechanical energy, thus increasing the cost of the resulting pulp.

SUMMARY OF THE INVENTION

The present invention provides oriented shaped articles such as fibers and films and pulp produced from fibers and films of a polymer blend having a first polymer phase of para-aramid polymer with an inherent viscosity greater than 3 dl/g. The first phase comprises between about 60 and about 99.8 weight percent of the shaped article. The shaped article includes a second polymer phase of meta-aramid polymer with an inherent viscosity greater than 0.2 dl/g with the second phase comprising between about 0.2 and about 40 weight percent of the shaped article. The second phase is present in the first phase in the form of generally discrete domains having a maximum cross-sectional dimension of about 1 micron.

In a preferred form of the invention, the second phase comprises between about 10 and about 40, most preferably about 20 to about 30 weight percent of said shaped article. The meta-aramid of said second phase preferably is selected from the class consisting of aromatic polyamides and copolyamides of the formulas:

—[—NH—Ar$_1$—NH—CO—Ar$_2$—CO—]— and
—[—NH—Ar$_1$—CO—]— where Ar$_1$ and Ar$_2$ are aromatic radicals which may be the same or different and are selected from the class consisting of m-phenylene; and lower alkyl, lower alkoxy or halogen-substituted m-phenylene. Most preferably, the meta-aramid is poly(m-phenylene isophthalamide) having an inherent viscosity greater than 0.5 dl/g. The preferred para-aramid is poly(paraphenylene terephthalamide) having an inherent viscosity greater than about 4 dl/g.

Pulp containing predominantly para-aramid polymer is produced in accordance with the invention by cutting a film or fiber in accordance with the invention transversely into generally uniform predetermined lengths and mechanically converting the generally uniform lengths into pulp, preferably by abrading in the presence of water.

In accordance with the invention, a process is provided for making an oriented shaped article from a polymer blend having between about 60 to about 98.8 weight percent para-aramid polymer and about 0.2 to about 40 weight percent of a second polyamide polymer. The process includes the steps of forming a solution of the para-aramid in a liquid solvent capable of dissolving both the para-aramid and the second polymer with the solution having a para-aramid concentration sufficient that the solution is anisotropic. The second polyamide is added to the anisotropic solution under sufficient agitation to form a two-phase liquid solution having a generally continuous anisotropic phase and a generally discontinuous isotropic phase of the second polymer with a domain size of less than about 100 microns. The anisotropic phase of the two-phase solution is oriented and the solvent is removed to produce an oriented, shaped article comprised of a two-phase blend of the para-aramid and second polymer.

The present invention provides oriented, shaped articles such as fibers, films and the like from two-phase blends of para-aramid/meta-aramid polymers which are readily converted to pulp. In accordance with the method of the invention, the application of abrading forces applied to the oriented, shaped articles causes fibrillation along interfaces or boundaries between the two phases and high quality, long fiber length pulp containing only thermally stable polymers is provided. The pulp produced is of lower cost than conventional para-aramid pulp and provides at least equivalent end-use performance and is potentially useful under high temperature and hydrolytic conditions.

DETAILED DESCRIPTION OF THE INVENTION

The oriented, shaped articles of the invention are comprised of a blend of at least one para-aramid polymer and at least one meta-aramid polymer. The term para-aramid in the present application is intended to refer to para-oriented, wholly aromatic polycarbonamide polymers and copolymers consisting essentially of recurring units of formulas I and II below $$-[-NH-Ar_a-NH-CO-Ar_b-CO-]- \qquad I$$

$$-[-NH-Ar_a-CO-]- \qquad II$$

wherein $Ar_a$ and $Ar_b$, which may be the same or different, represent divalent, para-oriented aromatic groups. By para-oriented is meant that the chain extending bonds from aromatic groups are either coaxial or are parallel and oppositely directed, e.g., substituted or unsubstituted aromatic groups including 1,4-phenylene, 4,4'-biphenylene, 2,6-naphthylene, 1,5-naphthalene, 4,4'-Ph-X-Ph, or 3,4'-Ph-X-Ph-, where Ph is a phenylene ring, and X=O, CCO, S, $SO_2$, NH, NH-CO and $(CH_2)_n$ (n=1–4). Substituents on the aromatic groups should be nonreactive and, as will become apparent hereinafter, must not adversely affect the characteristics of the polymer for use in the practice of this invention. Examples of suitable substituents are halogen, particularly chloro, lower alkyl and alkoxy groups. In addition, para-aramid is intended to encompass copolymers containing minor amounts of comonomers containing aromatic groups which are not para-oriented, such as, e.g., m-phenylene and 3,4'-biphenylene.

It is preferred for the para-aramid in the oriented, shaped articles of the invention to have an inherent viscosity of greater than 3 dl/g. Inherent viscosities greater than 3 dl/g are desirable to obtain a product having excellent end use characteristics. The most preferred para-aramid polymer for the invention is poly(p-phenylene terephthalamide) having an inherent viscosity of greater than about 4 dl/g.

Para-aramid polymers are capable in an appropriate solvent of forming an anisotropic solution, i.e., microscopic domains of the solution are birefringent and a bulk sample of the solution depolarizes plane polarized light due to the alignment of polymer chains in the domains which causes the light transmission properties of the domains to vary with direction.

The term meta-aramid is intended to refer to a class of wholly aromatic polymers and copolymers which do not form anisotropic solutions. Up to 50% of meta-aramid copolymer can be comonomers with chain extending bonds which are either coaxial or are parallel and oppositely directed as in Formula I above provided that the meta-aramid copolymer does not form an anisotropic solution. Preferably, meta-aramids of the invention are of the formulas III and IV below $$-[-NH-Ar_1-NH-CO-Ar_2-CO-]- \qquad III$$

$$-[-NH-A_1-CO-]- \qquad IV$$

where $Ar_1$ and $Ar_2$ are aromatic radicals which may be the same or different and are selected from the class consisting of m-phenylene; and lower alkyl, lower alkoxy or halogen-substituted m-phenylene. Lower alkyl and lower alkoxy refer to groups with 1–4 carbon atoms. Most preferably, the meta-aramid is poly(m-phenylene isophthalamide) having an inherent viscosity greater than 0.5 dl/g.

In the oriented, shaped articles of the present invention, the para-aramid polymer makes up the first polymer phase and the meta-aramid polymer is found in the second polymer phase. The first polymer phase is continuous in at least the direction of orientation in the shaped articles, e.g., along the length of a fiber or film.

The first polymer phase has crystalline regions which are oriented longitudinally, i.e., in the direction of extrusion. For the preferred form of the invention in which the para-aramid is poly(p-phenyleneterephthalamide) (PPD-T), the articles have an orientation angle of less than about 30°, preferably less than about 20°.

Figure 1:
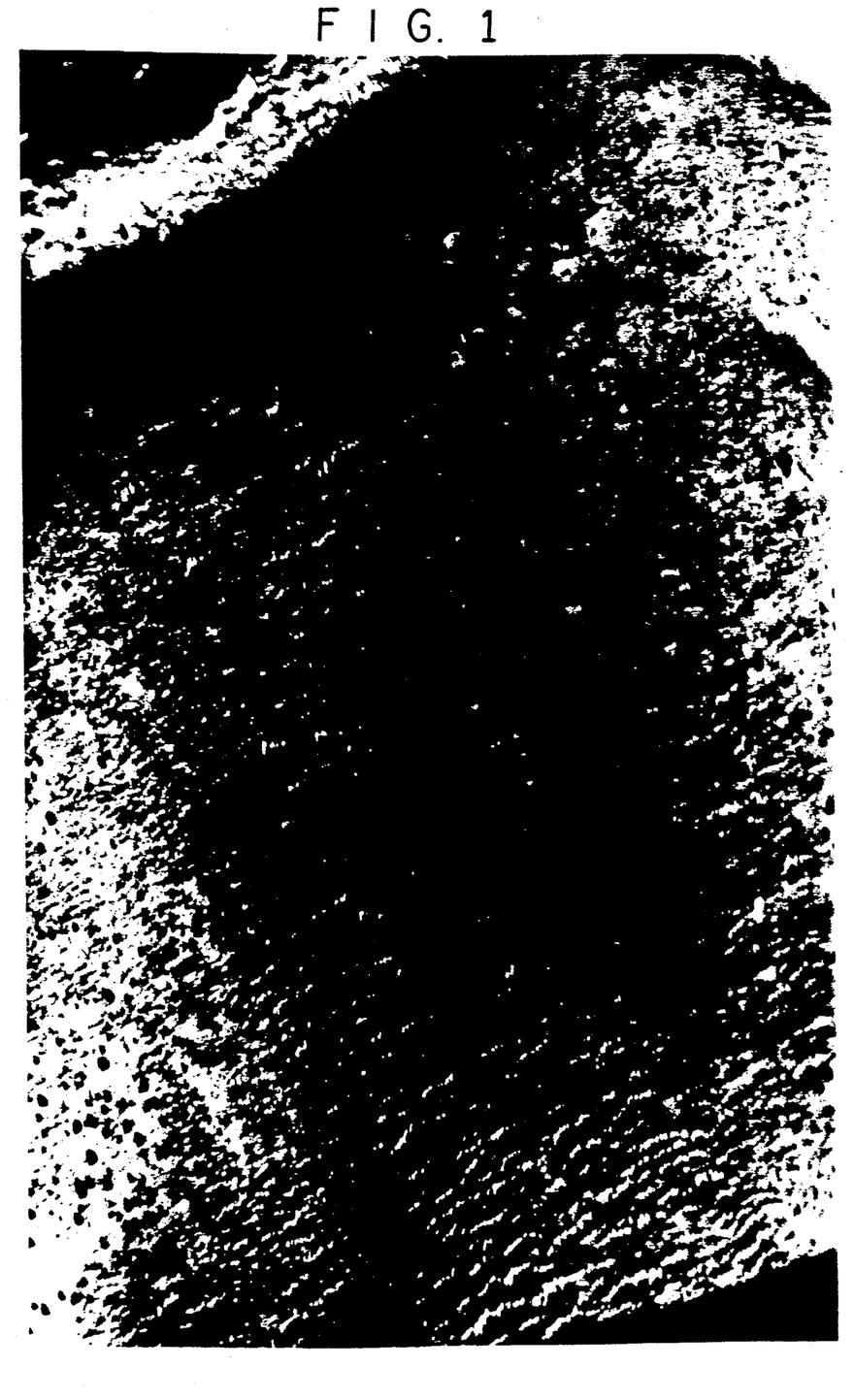
FIG. 1 is a transmission electron micrograph at 2800× in cross-section of a preferred fiber in accordance with the present invention.
Figure 2:
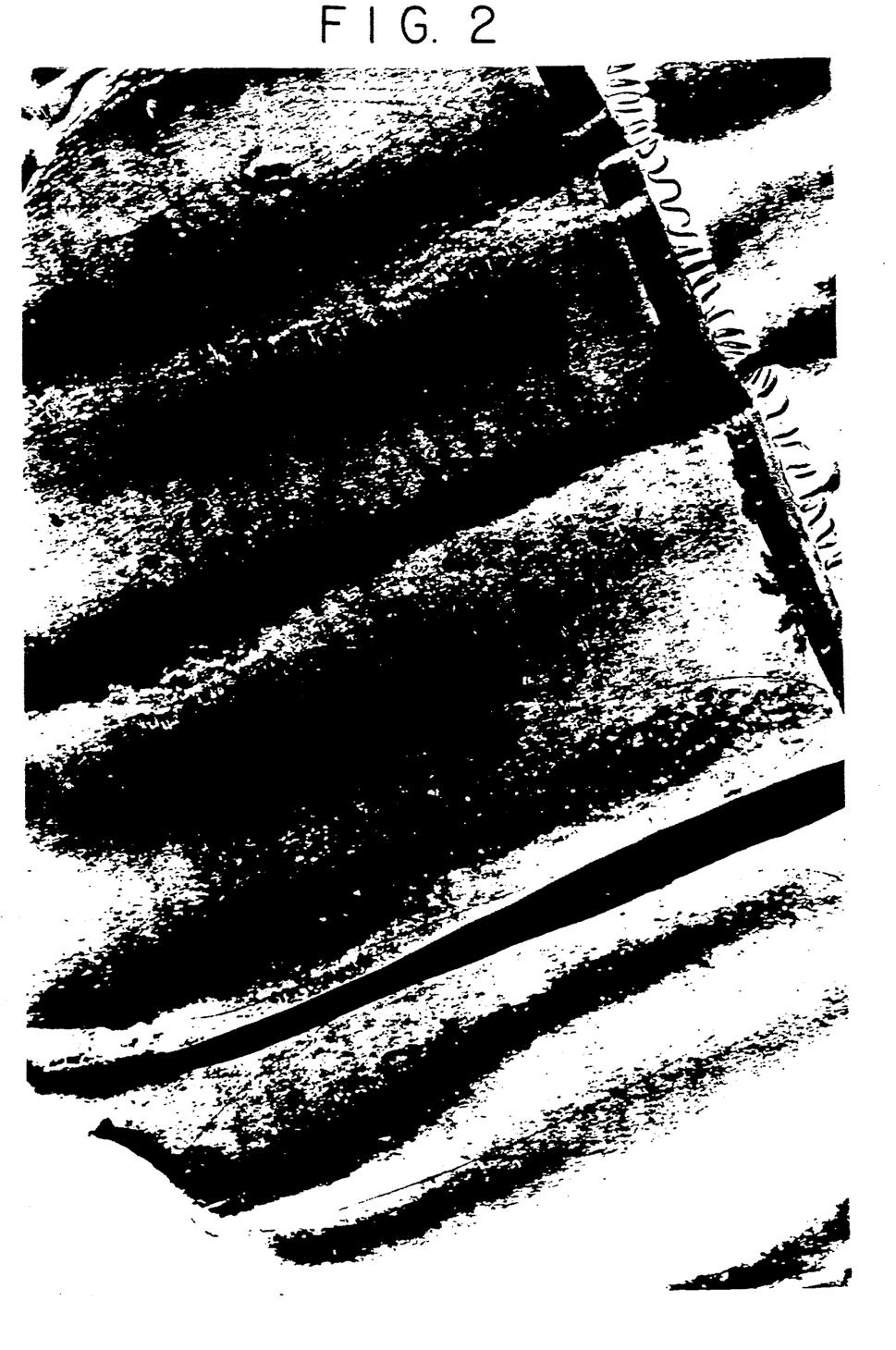
FIG. 2 is a transmission electron micrograph at 30,000× in cross-section of a preferred fiber in accordance with the present invention.

The second polymer phase is usually discontinuous and is present in generally discrete domains, the largest cross-sectional dimension of which will not exceed about 1 micron. "Maximum cross-sectional dimension" is intended to refer to the maximum domain dimension measured generally perpendicular to the direction of orientation, i.e., perpendicular to the direction of extrusion (length) for fibers and film. This structure is visible in FIGS. 1 and 2 which are cross-sectional transmission electron micrographs (XTEM) at 2800× and 30,000×, respectively. However, by optical microscopy, fibers in accordance with the invention appear to be homogeneous and very similar to conventional para-aramid fibers.

With the dispersion of the second polymer in the first polymer, the structure of the fiber is microscopically disrupted such that the fiber is easily sheared or split at the point of disruption and, hence, is readily pulpable Ideally, a fine dispersion of the second polymer in the fiber is desirable to achieve uniform disruption of fiber structure and, preferably, the domains have a maximum cross-sectional dimension of about 0.1 micron.

The first polymer phase comprises between about 60 percent and about 99.8 percent by weight of the article and the second polymer phase comprises between about 0.2 percent and about 40 percent weight of the article. In general, it is necessary for the first polymer phase to constitute 60 percent by weight of the article for the first phase to be continuous The percentage of meta-aramid polymer can be as low as 0.2 percent and provide improved pulpability It is preferred, however, for the meta-aramid to be between about 10 and about 40 percent by weight and most preferably between about 20 and about 30 percent by weight to obtain maximum benefits.

Elongate, oriented shaped articles in accordance with the invention can be produced by first forming a biphasic solution (two phases—anisotropic and isotropic) of the para-aramid polymer and the meta-aramid polymer in a common solvent The para-aramid polymer forms the anisotropic phase and the meta-aramid polymer forms the isotropic phase. Strong acids such as concentrated sulfuric acid, chlorosulfonic acid, fluorosulfonic acid and mixtures of these acids are appropriate solvents with sulfuric acid having a concentration of 98–102% being preferred For the solution to be biphasic, it is necessary for the concentration of the para-aramid polymer to be sufficiently high so that it is anisotropic and thus forms an anisotropic phase which is a discrete phase separate from the isotropic phase containing the meta-aramid polymer However, the resulting solids concentration should be low enough in the solvent used that the para-aramid polymer does not precipitate out of solution (12 to about 20 percent total solids is typical in sulfuric acid).

In order to obtain articles in accordance with the invention in which the second polymer phase containing the meta-aramid polymer is present in the first phase in the form of generally discrete domains having a maximum cross-sectional dimension of about 1 micron, it is necessary for the solution to have a finely dispersed second phase with the domain size of the dispersed second phase being less than about 300 microns, most preferably less than about 100 microns. While this can be achieved by adding the polymers simultaneously to the solvent and mixing with strong agitation over a long period of time, it is preferably accomplished in accordance with the method of the invention by first dissolving the less soluble para-aramid polymer in the solvent and then subsequently adding the more soluble meta-aramid polymer. The method of spin dope preparation is thus a staged solutioning process and is based on the observations that (1) rigid chain polymers such as poly(p-phenylene terephthalamide) (PPD-T), have limited solubility in strong acids and they require elevated temperatures for dissolution; and (2) meta-aramid polymers, such as poly(p-phenylene isophthalamide) (MPD-I) dissolve in strong acids readily to high concentrations even at room temperature. The staged solutioning method avoids the potential for poor mixing and poor heat transfer during dope preparation with simultaneous mixing of the dry polymers which can lead to an inhomogeneous spin dope containing a separate phase of rigid polymer either due to inadequate dissolution or to recrystallization. Prolonged mixing can also cause polymer degradation and trigger the recrystallization of rigid polymer due to interfacial solvent transfer. The method of the invention is particularly useful for polymer blends containing greater than 10 percent by weight of meta-aramid and for large scale mixing operations.

In the process of the invention, the temperature of the anisotropic para-aramid solution prior to adding the meta-aramid polymer must be sufficiently high to insure that the solution does not freeze (transform into a crystalline solvate) but should be not be so high that degradation of the polymers occurs in solution For 110° C. are useful In order to prevent gross phase separation, it is usually necessary to continue agitation of the solution or to form it into oriented, shaped articles shortly after the solution is formed In accordance with the process of the invention, the anisotropic phase of the biphasic solution is oriented and then the solvent is removed to produce oriented, shaped articles. A number of techniques can be used such as forming fibers by spinning or extruding the dope into films. Orientation of the anisotropic phase can be achieved by applying shear forces to or elongational flow to the liquid solution The techniques for solvent removal must be capable of removing the solvent from the high viscosity solutions (the solution viscosity is typically greater than 100 poise). Techniques which are suitable for this task are air-gap wet spinning and film extrusion processes where the solution passes through a spinneret or die into an air gap and subsequently into a coagulant bath where the solvent is removed from the blend. In general, fiber spinning and film extrusion processes useful for forming the para-aramid polymer into high strength fibers and films are useful for spinning the blend fibers in accordance with the present invention. Fibers of the invention can be produced by the method disclosed in U.S. Pat. Nos 3,767,756 and 3,869,429, the disclosures of which are hereby incorporated by reference.

Dopes can generally be extruded at any temperature where they are sufficiently fluid. Since the degree of polymer degradation is dependent upon time an temperature, temperatures below about 120° C. are usually used and temperatures below about 90° C. are preferable. If higher temperatures are required or desired for any reason, processing equipment should be designed so that the dope is exposed to the higher temperatures for a minimum time.

In accordance with the process described in U.S. Pat. Nos 3,767,756 and 3,869,429 for making fibers, dopes are extruded through spinnerets and the extruded dope is conducted into a coagulation bath through a noncoagulating fluid layer. While in the fluid layer, the extruded dope is stretched from as little as 1 to as much as 15 times its initial length (spin stretch factor). The fluid layer is generally air but can be any other inert gas or even liquid which is a noncoagulant for the dope. The noncoagulating fluid layer is generally from 0.1 to 10 centimeters in thickness.

The coagulation bath is aqueous and ranges from pure water, or brine, to as much as 70% sulfuric acid. Bath temperatures can range from below freezing to about 28° C. or, perhaps, slightly higher It is preferred that the temperature of the coagulation bath be kept below about 10° C., and more preferably, below 5° C., to obtain fibers with the highest tensile strength.

After the extruded dope has been conducted through the coagulation bath, the dope has coagulated into a fiber swollen with coagulant. The fiber should be thoroughly washed to remove salt and acid from the interior of the swollen fiber. Fiber-washing solutions can be pure water or they can be slightly alkaline. Washing solutions should be such that the liquid in the interior of the swollen fiber, after washing, should be essentially neutral.

The washed yarn can be dried by air drying or heating such as in an oven or by passing the wet yarn over multiple wraps on a pair of steam-heated rolls In accordance with the process for making pulp predominantly containing para-aramid polymer, a film or fiber in accordance with the invention is cut into uniform lengths, e.g., ¼ to 1 inch (0.6 to 2.5 cm). The length chosen is greater than or equal to the maximum pulp particle length desired The cut fiber is then suspended in water to form a floc which is subjected to high shear conditions to produce pulp. Equipment useful for refining cellulosic pulp such as refiners having abrading elements which rotate relative to one another are useful for this purpose. In pulping in accordance with the invention, shearing along boundaries between the first and second polymers phases results readily in the formation of high quality pulp particles with excellent pulp length.

TEST METHODS

Inherent Viscosity:

Inherent Viscosity (IV) is defined by the equation $$IV = ln(\eta rel)/c$$

where c is the concentration (0.5 gram of polymer in 100 ml of solvent) of the polymer solution and nrel (relative viscosity) is the ratio between the flow times of the polymer solution and the solvent as measured at 30° C. in a capillary viscometer. The inherent viscosity values reported and specified herein are determined using concentrated sulfuric acid (96% $H_2SO_4$) for para-aramids. For meta-aramids, a suitable organic solvent is used, for example, dimethylacetamide is used for MPD-I.

Domain Size—Spin Dopes:

Spin dopes were examined with optical microscopy to determine the biphasic nature of these solutions. For the biphasic para-aramid, meta-aramid sulphuric acid dopes, samples were prepared by scraping a thin layer of solidified dope at room temperature. This was placed between two glass slides. The slides were set into a Mettler FP82 hot stage held at about 90° C. when the dope melted, the slides were pushed firmly together using hand pressure This resulted in a thin, translucent layer of solution. The sample was allowed to relax for about 1-1.5 hours.

The samples were observed with polarized and cross polarized light using a Nikon polarizing optical microscope equipped with a camera. It has been shown that static (relaxed) isotropic solutions when placed between crossed polarizing elements will transmit essentially no light. However, anisotropic dopes will transmit light and a relatively bright field is observed. Since these solutions are composed of two phases, one being isotropic and one being anisotropic, the two phases can be distinguished by comparison of observation between polarized and cross polarized light. The samples were viewed and photographed at 100× Polaroid type 57 3000 ASA film was used Size of the isotropic domains was determined by measurement of isotropic domains on the photographs.

Denier:

The denier of a yarn is determined by weighing a known length of the yarn and converting to weight in grams per 9000 meters, Yarn Tensile Properties:

Yarns tested for tensile properties are first conditioned for at least 14 hours at 24° C. and 55% relative humidity and then twisted to a twist multiplier of 1.1. The twist multiplier (T.M.) of a yarn is used to correlate twist per unit of length with linear density and is defined as $$T.M. = \frac{(twists/inch)(denier\ of\ yarn)^{\frac{1}{2}}}{73}$$

Tenacity (breaking tenacity), elongation (breaking elongation), and modulus are determined by breaking test yarns on a computer controlled Instron tester (Instron Engineering Corp., Canton, Mass.) which records the stress-strain curve and calculates the properties.

Tenacity and elongation are thereby determined in accordance with ASTM D2101-1985 using sample yarn lengths of 25.4 cm and a rate of 50% strain/min.

The modulus is calculated from the slope of the secant at 0 and 0.5% strains on the stress-strain curve.

Consistency

Consistency refers to weight % solids of pulp in the slurry and is determined as follows:

The original refining charge is made up to 3.0% consistency by combining a known weight of fiber with a known volume of water Once refined enough to be uniform, the slurry is sampled with a 400 cc beaker and poured into a 1000 cc graduated cylinder immediately. The volume is measured then diluted to 1000 cc and put into pulp disperser for 5 minutes. The entire volume is returned to the 1000 cc cylinder, but poured into the Canadian Standard Freeness tester and immediately drained to give an uncorrected freeness reading (CSF). The pad is removed from the CSF tester screen, dried on a Noble & Wood hotplate until weight stabilizes, and weighed to determine total fiber content. If the weight is exactly 3 grams, the consistency is exactly 3%. If the weight varies (as it usually does, slightly) the reading represents the consistency.

Canadian Standard Freeness

This is a measure of the drainage rate of a suspension of 3 grams of fibrous material in 1 liter of water. Measurement and apparatus are according to TAPPI Standard T227 m-58. Results are reported as volume (ml) of water drained under standard conditions. The measured value is affected by the fineness and flexibility of the fibers and by their degree of fibrillation.

Clark Classification

This is a measure of the distribution of fiber sizes in a supply of fibrous material, for example in the pulp of this invention Measurement is according to TAPPI Standard T233 os-75 employing a Clark-type classifier. The test measures the weight percentage of fibrous stock retained on each of four progressively finer screens through which the stock is passed. The percentage passing through all four screens is obtained by difference, i.e., by subtracting from 100 the sum of the percent retentions on the screens. In the examples, the screen sizes employed were 14, 30, 50, and 100 mesh (U.S. Standard) with openings in mm of 1.41, 0.595, 0.297, and 0.149, respectively.

Surface Area

Surface areas are determined utilizing a BET nitrogen absorption method using a Strohlein surface area meter, Standard Instrumentation, Inc., Charleston, W. Va. Washed samples of pulp are dried in a tared sample flask, weighed and placed on the apparatus. Nitrogen is absorbed at liquid nitrogen temperature Adsorption is measured by the pressure difference between sample and reference flasks (manometer readings) and specific surface area is calculated from the manometer readings, the barometric pressure and the sample weight.

Epoxy Laminate

Epoxy laminates were made by preparing paper hand sheets from pulp, saturating the sheets with epoxy resin and press curing into laminates.

The hand sheets were prepared by mixing 10 g of dried (150°-180° F. for 16-20 hrs.) pulp in 2,000 mL of water in a 2 gallon Waring blender at high speed, pouring into a paper-making tank and removing the water via vacuum. The sheets were dried in a paper sheet dryer at 200° C. Each 12"×12" sheet so prepared weighed about 10 g. The sheets were further dried in a vacuum oven for 3 hours at 110°-120° F. and hand-painted (paint brush) with an epoxy resin comprised of Epon Resin 826 (100 g), RD-2 Resin (25 g) and Tonox Resin 60/40 MDDA/MDA (30 g). The resin mixture was prepared immediately before use by adding the RD-2 Resin to Epon Resin 826, heating to about 50° C. and mixing for a few minutes with the Tonox Resin which had been separately heated. To complete laminate preparation, about 8 resin-coated sheets were combined, compressed with 40 tons pressure, and cured initially at 75° C. for 1¼ hrs. and then at 150° C. for one hour. Laminate thickness was controlled in the press with 60 mil shims. Under the conditions described, the volume fraction of pulp and resin were about equal in the laminate. After cooling, seven 1"×7" strips were cut from the laminate for tensile testing. Testing on a MODPAK-2 Instron (C&D Associates Inc., Alexandria, Va.) gave strength and modulus in p.s.i. Instron settings were: Full-Scale Load, 30,000 lbs ; and Cross Head Speed, 0.05. Modulus values were normalized to a laminate with an equal volume percent of fiber and resin.

Brake Bar Flex Strength

This test was according to ASTM D-790-81, Method 1. The brake mix employed was composed of:

| | |
|---|---|
| 200-mesh Dolomite (basically CaCO₃) | 1000 g |
| Barium sulfate | 300 g |
| Cardolite 126 (cashew nut modified phenolic resin) | 300 g |
| Cardolite 104-40 CFP (hardened cashew nut resin particles) | 300 g |
| Selected pulp of PPD-T fibers | 100 g |

The pulp sample was fluffed for 5 to 10 min in a high-speed mixer Remaining materials were added with mixing in the same mixer for 3 to 5 min or until a visibly uniform dispersion resulted. The mixture was molded into 3×6×0.25 inch (7.6×15.2×0.635 cm) plaques. Molding conditions were (1) 195-200 g of brake mix (2) 40-50 tons pressure, (3) heat to 180° C. in 30 min. and hold at temperature for 15 minutes Some plaques were subsequently cut into 1×6×0.25 inch (2.5×15.2×0.635 cm) bars for testing. Three bars were tested as cut in a 70° F. (21.1° C.) atmosphere. Three other bars were conditioned first in an oven at 350° F. (177° C.) for 3 to 16 hours and then tested in a hot-box at 350° F. (177° C.). Each bar was centered on two supports spaced 4.225 in (10.8 cm) apart and pushed downwardly at its midpoint by a blunt pressure-foot moving 2.0 in/min (5.1 cm/min). None of these bars failed catastrophically. Instead, the maximum stress just before a sharp discontinuity in the stress-strain curve was used to compute Brake Bar Flex Strength.

SAE 661a Chase Friction Test

The procedure and equipment used were exactly as described in SAE J661a (last editorial change September 1971). The 1×1×0.25 inch (2.5×2.5×0.635 cm) test samples (2) were cut from the plaques as described above under "Brake Bar Flex Strength". For clarity, the "constant load" version of the test was employed.

Fiber X-ray Orientation Angle:

A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film (Catalogue Number 154-2463), in a Warhus pinhole camera. Collimators in the camera are 0.64 mm in diameter. The exposure is continued for about fifteen to thirty minutes (or generally long enough so that the diffraction feature to be measured is recorded at an Optical Density of ~1.0).

A digitized image of the diffraction pattern is recorded with a video camera. Transmitted intensities are calibrated using black and white references, and gray level is converted into optical density A data array equivalent to an azimuthal trace through the two selected equatorial peaks is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak. Both peaks are measured and the Orientation Angle is taken as the average of the two measurements.

Fiber Length in Pulp

Fiber is prepared by adding 0.2 g of fiber to 1000 ml of H₂O mixing in a Waring blendor for 30 seconds. 750 ml of solution is poured out, 750 ml of H₂O is added, and the solution is mixed in Waring blendor for 30 seconds. The dilution and mixing is repeated twice.

200 ml of the resulting solution is poured into an operating fruit juicer that has a piece of black cloth inside The juicer is turned off and the cloth with fiber is removed and dried.

Six different photographs of the cloth are taken with a microscope at 8× or 12× along with a metric ruler at the same magnification and are photocopied.

Using a HP 9816 computer with appropriate software, a copy of the ruler is placed on a HP 911A Graphics Tablet and points are marked as to the length. This distance is entered into the computer Copies of the fibers are measured on the Graphics Tablet until a total of 500 to 600 fibers lengths are recorded. The program is used to provide a plot of the fiber length distribution.

Refining Parameter

In laboratory evaluation, the pulp abrading process is simulated by passing a fiber slurry through a small laboratory abrading apparatus at predetermined disc openings in several passes while measuring the degree of fibrillation of short fibers in terms of Canadian Standard Freeness (CSF). The value of CSF decreases as the degree of fibrillation increases.

Thus, the degree of fibrillation of an abraded fiber increases with the number of passes and with decreasing disc opening This permits one to assess the readiness of fibrillation of a fiber by the use of a mathematical parameter combining the number of passes, n, and the disc opening, d, in an accumulative form:

*Refining Parameter* $= \Sigma n/d$

The symbol $\Sigma$ indicates the addition of n/d values for multiple abrading passes at various disc openings Thus, the refining parameter accumulates the effect of each and all abrading passes of a fiber slurry through the abrading apparatus. Its values can be correlated with the CSF values to show how readily a fiber can be refined to attain a given degree of fibrillation.

CONTROL

This describes the preparation, characterization and testing of poly(p-phenylene terephthalamide) fiber and pulp which was used as a control for comparison with Examples of this application.

Spin dope was prepared by cooling 249.2 pounds (113.04 kg) of 100% by weight sulfuric acid in a mixer until its temperature was −12° C. and then adding 60 pounds of particulate poly(p-phenylene terephthalamide) polymer having an inherent viscosity of 5.57 g/dl over a period of 10 minutes. Mixing was continued for an additional 5 minutes under vacuum, and then the temperature of the mixer jacket was raised to 75° C. and mixing was continued at that temperature for 75 minutes. Then the jacket temperature was increased to 80° C. for 45 minutes of mixing under vacuum. The agitation was stopped for 15 minutes before turning off the vacuum and the mixer was pressurized to 5 psig (34.5 kPa gauge) with nitrogen for transfer of the spin dope to the spinning apparatus. The total mixing energy was 0.4 kw-hr/lb of dry polymer. The spin dope thus obtained was homogeneous, and was anisotropic (19.4% solids) as evidenced by its depolarization of a cross polarized light when a thin layer of this dope was viewed between glass slides on an optical microscope at room temperature.

The spin dope was pumped to and through a spinneret having 1000 holes 2.5 mils (0.0635 mm) in diameter. The downwardly extruded filaments passed through an air gap of 0.25 in. (6.4 mm) before entering an aqueous coagulating bath at 2° C. containing 5% by weight sulfuric acid. The spinning process and apparatus were as described in U S. Pat. No. 4,340,559, the disclosure of which is incorporated herein by reference. Yarn was withdrawn from the coagulating bath at about 300 ypm (365.8 m/min) by feed rolls and then passed in multiple wraps around two sets of rolls, washing first with water spray and then neutralizing with dilute caustic sprays. Tension during washing and neutralizing was 0.7 gpd (0.62 dN/tex). Before applying finish and winding up the yarn, it was dried by multiple wraps around a pair of rolls internally heated by saturated steam. Tension on the yarn entering the set of drying rolls was about 0.7 gpd (0.62 dN/tex) and steam temperature was 130° C. The physical properties of the resulting control yarn are presented in Table 1.

To convert the control yarn to pulp, the yarn was cut to ¼" to ¾" long floc using a guillotine cutter; the floc was slurried in water (1-5% solids) and poured into a 12 in. diameter, single-disk refiner (Sprout-Waldron, Muncy, Pa.) typical of devices used to refine wood pulp. The refiner was operated at 1800 rpm, with energy per pass, typically, 0.03-0.06 Kw hr. Pulp length was controlled by the gap between plates in the refiner (0.001-0.015 in.), plate designs and the number of passes through the refiner. Three different control pulps were made (A-C) under the conditions listed in Table 2. Goal pulp length was 0.5-3 mm. The pulp slurry was dewatered and the pulp was dried (85° C., 2 hr.) in an oven, shredded and fluffed to produce individual fibers.

The pulp was characterized by determination of the consistency, the Canadian Standard Freeness, the Clark Classification, and the surface area. Reinforcing quality of the pulp was determined by measuring the tensile strength of epoxy laminates and flex strength of phenolic-based disk brake bars. Data on the control pulp, reinforcing quality and friction and wear properties are given in Table 2.

EXAMPLES 1–4

Examples 1–4 illustrate the preparation of a series of para-aramid/meta-aramid blend fibers containing poly(p-phenylene terephthalamide) (PPD-T), and poly(m-phenylene isophthalamide) (MPD-I), at various weight fractions, as well as the preparation, characterization and testing of pulp from these blend fibers.

In Example 1, the process of the Control was repeated except that a dry polymer mixture containing 99.5 wt. % PPD-T (inherent viscosity 6.3 dl/g) and 0.5 wt. % MPD-I (inherent viscosity 1.6 dl/g) was added to the sulfuric acid in the mixer as the starting material in the preparation of spin dope. The mixing temperature was 80° C. for 1 hour. The mixing energy was 0.2 kw-hr/lb of dry polymer. The spin dope thus obtained had 19.6 percent by total polymer weight, was anisotropic and was homogeneous without any PPD-T solid phase when it was examined as a thin film between two glass slides on a polarizing optical microscope.

The spin dope was spun into fibers using the same process as was used in the Control. The fibers thus obtained exhibited a homogeneous morphology when they were examined under a polarizing optical microscope at 500–750× magnification. A thin cross-section of the fiber about 20 nm (200 Å) thick was examined by a transmission electron microscope (XTEM) at 25,000–50,000× magnification, it showed an essentially homogeneous morphology with only a hint of a second phase of approximately 10–30 nm (100–300 Å) round or elliptical domains in a very minute amount. The yarn and filament properties of this fiber are given in Table 1.

Examples 2, 3, and 4 were prepared in the same manner as Example 1, except that the weight fraction of MPD-I in the polymer blend was increased to 2.5, 5.0 and 20.0 by weight, respectively. As the weight fraction of MPD-I was increased, the mixing temperatures and times for the preparation of the spin dopes were selected to avoid PPD-T phase separation and are listed into Table 1. Spin dopes in these examples were, also, anisotropic and homogeneous when examined by a polarizing optical microscope. The fibers thus obtained also exhibited a homogeneous morphology when examined by a polarizing optical microscope 500–750×. However, when slices of the fibers approximately 20 nm thick were examined by an XTEM, they showed domains of a dispersed second phase of about 0.1–1 micron. The number of microscopic domains increased with increasing weight fraction of MPD-I in the polymer blend. The yarn and filament properties of these blend fibers are given in Table 1.

The PPD-T/MPD-I blend yarns of Examples 1–4 were converted to pulp and the pulp was characterized in the same manner as for the Control. The gap between the refiner plates and the number of passes were adjusted to give a consistency similar to the appropriate Control pulp sample; data are given in Table 2. In general, fewer refiner passes were required for the PPD-T/MPD-I blends than for the unblended PPD-T Control In addition, the pulp samples of blend were superior to the corresponding Control pulp samples in terms of having more long fibers (14 mesh, %) and fewer fines (-100 mesh, as shown in in Table 2.

Reinforcing quality of the PPD-T/MPD-I blend pulp was measured on epoxy laminates and disk brake bars in the same manner as used for Control pulp. While there was some scatter in the data, the blend pulp samples tested as well as or better than the Controls, particularly in terms of brake flex and wear properties. These data in Table 2 illustrated the utility of the superior quality of the MPD-1 blend pulp (i.e., longer fibers and fewer fines).

EXAMPLE 5

This example illustrates the preparation of a blend fiber containing 95 wt. % copoly(p-phenylene terephthalamide/p-phenylene 2,6-naphthalamide) and 5 wt. % poly(m-phenylene isophthalamide).

The mixing procedure for the spin dopes of Examples 1–4 was repeated except that a dry mixture of 1.9 lb. (862.6 gm) of 95/5 copoly(p-phenylene terephthalamide/p-phenylene 2,6-naphthalamide) (95/5 mole ratio, inherent viscosity 6.5) and 0.1 lb. (45.4 gm) of poly(m-phenylene isophthalamide) (inherent viscosity 1.4) were mixed with sulfuric acid for about 15 minutes when heated to 75° C. and about 15 minutes when cooled to 70° C. The resulting spin dope was anisotropic and homogeneous without the separation of a solid phase. The spin dope was spun into fibers using the same process as was used in the Control The fibers thus obtained exhibited a homogeneous morphology when they were examined by a polarizing optical microscope at 500–750× magnification. The fiber tensile properties are given in Table 1.

Pulping conditions and pulp properties are given in Table 2.

EXAMPLE 6 for 1 hour. Dry MPD-I was added to the solution so prepared with mixing, while cooling the mixture to 65° C. The resulting spin dope was anisotropic when it was examined by a polarizing optical microscope and showed discrete isotropic domains of less than about 100 microns. It was then spun into fibers using the same process as was used in the Control. The fibers thus obtained exhibited a homogeneous morphology when they are examined by a polarizing optical microscope at 500–750× magnification. When a thin cross section of the fiber was examined by TEM at high magnification, it showed a dispersion of 0.1–1 micron domains of the MPD-I phase. The tensile properties of these fibers are presented in Table 1.

TABLE 1

|  | Control | Ex. 1 | Ex. 2 | Ex. 3 | Ex. 4 | Ex. 5 | Ex. 6 |
|---|---|---|---|---|---|---|---|
| Para-aramid | PPD-T | PPD-T | PPD-T | PPD-T | PPD-T | PPD-T/PPD-2,6N (95/5 mole ratio) | PPD-T |
| Meta-aramid | None | MPD-I | MPD-I | MPD-I | MPD-I | MPD-I | MPD-I |
| Flexible Polyamide, wt % | 0 | 0.5 | 2.5 | 5.0 | 20.0 | 5.0 | 30.0 |
| Solutioning method | Simul. | Simul. | Simul. | Simul. | Simul. | Simul. | Staged |
| % Solids | 19.5 | 14.0 | 19.6 | 19.4 | 19.6 | 19.6 | 19.0 |
| Mixing Temp., °C. | 70/80 | 80 | 75 | 75 | 75 | 75/70 | 70–78/65 |
| Mixing Time, Hr. | 1.5/0.5 | 1 | 0.67 | 2 | 0.5 | .25/.25 | 1.5/0.5 |
| Mixing Energy, Kw-hr/lb. | 0.4 | 0.2 | 0.07 | 0.4 | 0.1 | 0.10 | 0.40 |
| Phase Separation | No | No | No | No | No | No | No |
| Yarn Properties |  |  |  |  |  |  |  |
| Denier | 1500 | 134 | 121 | 1657 | 114 | 60 | 1540 |
| Tenacity, gpd | 23.5 | 21.0 | 22.6 | 20.5 | 12.1 | 19.2 | 13.2 |
| Elongation, % | 2.9 | 3.9 | 3.9 | 3.7 | 2.9 | 3.3 | 3.2 |
| Modulus, gpd | 820 | 411 | 486 | 505 | 410 | 770 | 408 |
| Fiber Morphology |  |  |  |  |  |  |  |
| Optical microscopy | Homogeneous | Homogeneous | Homogeneous | Homogeneous | Homogeneous | Homogeneous | Homogeneous |
| TEM | 1 Phase | 1 Phase | Biphas. | Biphas. | Biphas. | Biphas. | Biphas. |

TABLE 2
PULP REFINING CONDITIONS, CHARACTERIZATION AND END-USE PERFORMANCE

| Example No. | Control A | Example 1 | Control B | Example 2 | Example 3 | Example 4 | Example 5 | Control C |
|---|---|---|---|---|---|---|---|---|
| Wt. % MPD-I | 0 | 0.5 | 0 | 2.5 | 5 | 20 | 30 | 0 |
| Control Comparison | — | A | — | B | C | B | B | — |
| Refining | 2031-56-1 | 2031-56-3 | 2031-52-1B | 2031-52-3B | 2031-49-11 | 2031-52-4B | 2031-59-2 | 2031-49-12 |
| Fiber | 1804-44-104 | 1804-72 | 2031-52-1B | 1804-6 | 1631-114-28 | 1804-10 | 1838-46-1 | 1631-114-23 |
| Refining |  |  |  |  |  |  |  |  |
| Passes/gap .010 | 30 | 0 | 0 | 0 | 5 | 0 | 0 | 22 |
| Passes/gap .005 | 7 | 0 | 0 | 0 |  | 0 | 0 |  |
| Passes/gap .001 | — | 4 | 4 | 4 |  | 4 | 4 @ .002 in. |  |
| Consistency, % | 3.1 | 3.1 | 1% | 1% | 3% | 1% | 1% | 3% |
| CSF, cc | 352 | 251 | 548 | 142 | 375 | 44 | 160 | 374 |
| Clark Classification |  |  |  |  |  |  |  |  |
| 14 mesh, % | 1.8 | 8.5 | 2.5 | 5.2 | 20.9 | 42 | 3.5 | 1.0 |
| −100 mesh, % | 21 | 20 | 20 | 13 | 15.9 | 8.5 | 11 | 23.6 |
| Surface, m²/g | 5.6 | 5.3 | 4.2 | 10.3 | 10.5 | 19.0 | 16.3 | 5.5–9.6 |
| Lam. UTS, Mpsi | 25.6 | 25.5 |  |  | 24.3 |  |  | 24.0 |
| Lam. UTM, MMpsi | 1.29 | 1.24 |  |  | 1.37 |  |  | 1.21 |
| Lam. Vf, % | 42.5 | 47.3 |  |  | 49.4 |  |  | 48.6 |
| Brake Flex, psi |  |  |  |  |  |  |  |  |
| 70° F. strength | 6450 | 6810 | 3440 | 3900 | 6625 | 3140 |  | 6430 |
| 350° F. strength | 1830 | 2020 | 900 | 1050 | 2170 | 928 |  | 1945 |
| Friction, Coef. cold/hot | .342/.365 | .337/.364 | .362/.382 | .335/.346 | .343/.372 | .323/.350 |  | .334/.366 |
| Wear, % mass loss | 2.96 | 1.70 | 3.63 | 1.61 | 3.32 | 1.97 |  | 3.00 |

This example illustrates the method in accordance with the invention for the preparation of para-aramid/meta-aramid blends by staged solutioning which assists in avoiding the phase separation of the para-aramid polymer and ensures its fiber spinning continuity.

A 70/30 weight % PPD-T/MPD-I blend fiber was made using a spin dope prepared by mixing dry PPD-T with sulfuric acid at 70° C. for 1 hour and then at 78° C.

CONTROL D AND EXAMPLES 7 AND 8

Control D is based on a commercial Kevlar ® 29 (PPD-T) fiber product (sold by E. I. du Pont de Nemours, Wilmington, Del.) Example 7 is based on a polymer blend containing 95 wt. % PPD-T and 5 wt. %

MPD-I obtained by single-stage solution preparation and subsequent air gap spinning to yarn as in Examples 1-4 Example 8 is based on a polymer blend containing 80 wt. % PPD-T and 20 wt. % MPD-I obtained by two-stage solution preparation and subsequent air gap spinning to yarn (like Example 6).

The yarns of Control D, Example 7 and Example 8 were each separately cut transversely to form about ¼ in. fibers. Approximately 1 lb. of each fiber sample so prepared was mixed with water to prepare a 1 wt. % slurry of short fibers The fiber slurry was fed into a 12 in. diameter Sprout-Waldron laboratory refiner operating at 1800 rpm A small sample of the effluent slurry was taken and measured for its CSF. It was then fed into the refiner again, and the effluent tested. This process was repeated until a CSF of about 320 was reached. The resulting slurry was filtered and the pulp thus obtained was kept wet in a plastic bag. A sample of the resulting pulp was taken and measured for its average pulp length.

Figure 3:
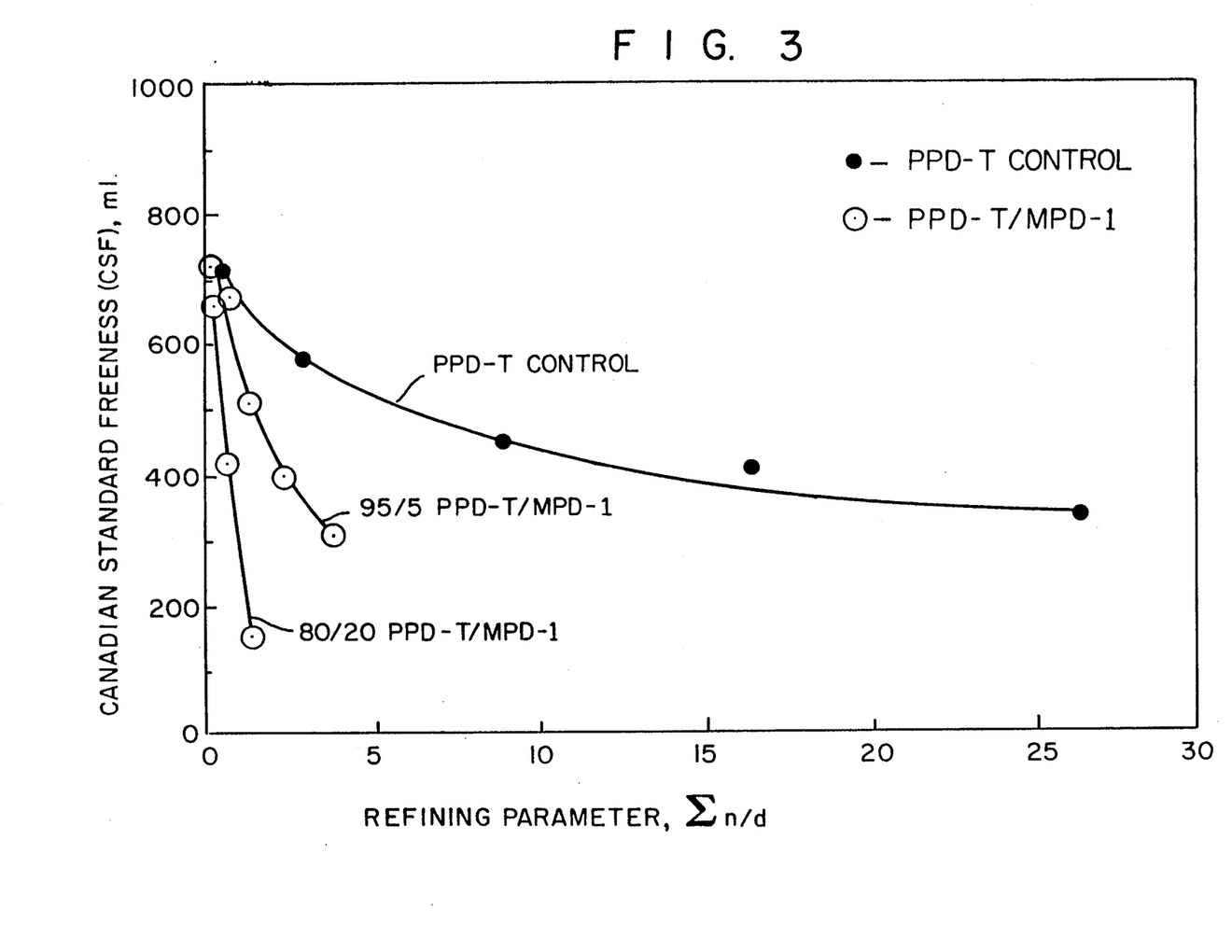
FIG. 3 is a graphical representation of Canadian Standard Freeness (CSF) plotted against a refining parameter represented by which is defined hereinafter for a pulping process for preferred fibers in accordance with the invention and control fibers.

Table 3 summarizes all experimental results of laboratory refining. FIG. 3 presents a correlation of CSF vs. the refining parameter, Σ n/d, for PPD-T, and 95/5 and 80/20 PPD-T/MPD-I blend fibers In all cases, CFS decreases with increasing value of refining parameter, which reflects the process of pulp refining. The CSF values of 95/5 PPD-T/MPD-I (Example 7) decrease more rapidly with increasing value of refining parameter than PPD-T. This indicates that the blend fibers were more readily refinable than PPD-T fiber. The curve for 80/20 PPD-T/MPD-I (Example 8) (FIG. 3) decreases even more rapidly, indicating superior refinability.

In addition to superior refining readiness, the PPD-T/MPD-I pulp from both 95/5 and 80/20 blend compositions also exhibited greater average pulp length than Kevlar ® fiber pulp (see Table 3). This was surprising since it is difficult to produce a highly fibrillated pulp with relatively long pulp length by the mechanical abrading process. The PPD-T/MPD-I blend fibers of this invention provide not only superior refining readiness, but also pulp products with a high degree of fibrillation in combination with relatively long average pulp length.

TABLE 3

|  | Composition | Yarn Properties | | | No. of Disc Passes n | Refining Performance | | | Avg. Pulp Leng., mm |
|---|---|---|---|---|---|---|---|---|---|
|  |  | Tenacities gpd | Elongation % | Modulus gpd |  | Opening d, mil | Refining Parameter n/d | CSF, ml |  |
| Control D | PPD-T (Kevlar ® 29) | 23.0 | 3.6 | 585 |  |  |  |  |  |
|  |  |  |  |  | 5 | 10 | 0.5 | 720 |  |
|  |  |  |  |  | 5 | 2 | 3.0 | 583 |  |
|  |  |  |  |  | 12 | 2 | 9.0 | 450 |  |
|  |  |  |  |  | 15 | 2 | 16.5 | 400 |  |
|  |  |  |  |  | 20 | 2 | 26.5 | 321 | 0.604 |
| Example 7 | 95/5 PPD-T/MPD-I | 21.1 | 3.5 | 548 |  |  |  |  |  |
|  |  |  |  |  | 3 | 10 | 0.3 | 727 |  |
|  |  |  |  |  | 5 | 10 | 0.8 | 677 |  |
|  |  |  |  |  | 1 | 2 | 1.3 | 508 |  |
|  |  |  |  |  | 2 | 2 | 2.3 | 395 |  |
|  |  |  |  |  | 3 | 2 | 3.8 | 309 | 0.952 |
| Example 8 | 80/20 PPD-T/MPD-I | 20.1 | 3.5 | 540 |  |  |  |  |  |
|  |  |  |  |  | 3 | 10 | 0.3 | 672 |  |
|  |  |  |  |  | 5 | 10 | 0.8 | 424 |  |
|  |  |  |  |  | 1 | 2 | 1.3 | 162 | 0.951 |

I claim:

1. An oriented, shaped article in the form of a film or fiber comprising a polymer blend having a first polymer phase of para-aramid polymer with an inherent viscosity greater than 3 dl/g, said first phase comprising between about 60 and about 99.8 weight percent of said shaped article and a second polymer phase of meta-aramid polymer with an inherent viscosity greater than 0.2 dl/g, said second phase comprising between about 0.2 and about 40 weight percent of said shaped article and being present in the first phase in the form of generally discrete domains having a maximum cross-sectional dimension of about 1 micron.

2. The shaped article of claim 1 wherein said second phase comprises between about 10 and about 40 weight percent of said shaped article.

3. The shaped article of claim 1 wherein said second phase comprises between about 20 and about 30 weight percent of said shaped article.

4. The shaped article of claim 1 wherein said second phase is present in the first phase in the form of generally discrete domains having a maximum cross-sectional dimension of about 0.1 micron.

5. The shaped article of claim 1 wherein said meta-aramid polymer is selected from the class consisting of aromatic polyamides and copolyamides of the formulas:

where $Ar_1$ and $Ar_2$ are aromatic radicals which may be the same or different and are selected from the class consisting of m-phenylene and lower alkyl, lower alkoxy and halogen-substituted m-phenylene.

6. The shaped article of claim 1 wherein said meta-aramid is poly(m-phenylene isophthalamide) having an inherent viscosity greater than 0.5 dl/g.

7. The shaped article of claim 1 wherein said para-aramid is poly(p-phenylene terephthalamide) having an inherent viscosity greater than about 4 dl/g.

8. The shaped article of claim 1 in the form of a film.

9. The shaped article of claim 1 in the form of a fiber.

* * * * *